US008215596B2

(12) United States Patent
Duan et al.

(10) Patent No.: US 8,215,596 B2
(45) Date of Patent: Jul. 10, 2012

(54) HINGE ASSEMBLY

(75) Inventors: Jun-Wu Duan, Shenzhen (CN); Fan Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 571 days.

(21) Appl. No.: 12/417,806

(22) Filed: Apr. 3, 2009

(65) Prior Publication Data

US 2010/0065694 A1 Mar. 18, 2010

(30) Foreign Application Priority Data

Sep. 17, 2008 (CN) .......................... 200810304540.3

(51) Int. Cl.
*F16M 11/00* (2006.01)
(52) U.S. Cl. ...................... 248/176.1; 248/130; 248/921; 403/93; 403/117; 403/95; 403/96; 16/337; 16/374; 16/344
(58) Field of Classification Search ............... 248/176.1, 248/921, 324, 130, 276.1; 16/337, 341, 374, 16/376, 342, 338, 343, 344, 340; 403/117, 403/95, 93, 97
See application file for complete search history.

(56) References Cited

U.S. PATENT DOCUMENTS

| | | | | |
|---|---|---|---|---|
| 3,586,355 A * | 6/1971 | Magi | ................................ | 403/91 |
| 6,163,928 A * | 12/2000 | Chung | ............................ | 16/342 |
| 6,618,903 B2 * | 9/2003 | Kim | ................................ | 16/337 |
| 6,666,422 B1 * | 12/2003 | Lu et al. | ...................... | 248/291.1 |
| 6,813,813 B2 * | 11/2004 | Lu et al. | ........................... | 16/342 |
| 6,862,779 B1 * | 3/2005 | Lu et al. | ........................... | 16/340 |
| 6,918,159 B2 * | 7/2005 | Choi | ................................ | 16/347 |
| 7,082,643 B2 * | 8/2006 | Lu et al. | ........................... | 16/340 |
| 7,353,569 B2 * | 4/2008 | Chen et al. | ...................... | 16/340 |
| 7,506,408 B2 * | 3/2009 | Lu et al. | ........................... | 16/340 |
| 7,520,025 B2 * | 4/2009 | Hung | ................................ | 16/337 |
| 7,530,541 B2 * | 5/2009 | Wang et al. | .................. | 248/284.1 |
| 7,603,747 B2 * | 10/2009 | Ho et al. | .......................... | 16/330 |
| 7,708,239 B2 * | 5/2010 | Watanabe et al. | ............ | 248/125.7 |
| 7,753,331 B2 * | 7/2010 | Tang et al. | .................. | 248/284.1 |
| 7,845,051 B2 * | 12/2010 | Saito et al. | ...................... | 16/337 |
| 7,958,600 B2 * | 6/2011 | Kuo et al. | ........................ | 16/342 |
| 7,987,560 B2 * | 8/2011 | Wang | .............................. | 16/367 |
| 2007/0119024 A1 * | 5/2007 | Kim | ................................ | 16/337 |
| 2008/0141489 A1 * | 6/2008 | Hsu et al. | ......................... | 16/223 |
| 2009/0146024 A1 * | 6/2009 | Duan | ............................. | 248/157 |
| 2010/0096516 A1 * | 4/2010 | Zhou et al. | .................. | 248/122.1 |
| 2011/0146159 A1 * | 6/2011 | Zhang et al. | .................... | 49/394 |

FOREIGN PATENT DOCUMENTS

| | | |
|---|---|---|
| CN | 1360167 A | 7/2002 |
| TW | 527073 | 4/2003 |
| TW | M318090 | 9/2007 |
| TW | 200827982 A | 7/2008 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A hinge assembly includes a pivot shaft, a first supporting member, a second supporting member, and a positioning member. The first supporting member is rotatably sleeved on the pivot shaft. A positioning protrusion is formed on the first supporting member. The second supporting member is non-rotatably sleeved on the pivot shaft. The positioning member has an elastic portion and is non-rotatably sleeved on the pivot shaft. A positioning groove receiving the positioning protrusion is defined in a periphery of the positioning member and adjacent to the elastic portion. An LCD device is further provided in the present disclose.

7 Claims, 5 Drawing Sheets

HINGE ASSEMBLY

CROSS-REFERENCE STATEMENT

This application is related to one co-pending U.S. patent application, application Ser. No. 12/417,813, and entitled "HINGE ASSEMBLY". The co-pending application has the same assignee as the present application.

BACKGROUND

1. Technical Field

The present disclosure relates generally to hinge assemblies and, more particularly, to a hinge assembly for a liquid crystal display device.

2. Description of Related Art

Liquid crystal display (LCD) devices are gradually replacing conventional cathode ray tube (CRT) devices because LCD devices have better display qualities and are thinner and lighter than CRT devices. A tilt angle of an LCD panel of the LCD device can be adjusted via a typical hinge.

The typical hinge includes a shaft, a first stand, a second stand, a cam, a cam follower, a plurality of flat washers, and a screw. The shaft extends through the first stand, the cam, the cam follower, the second stand, a plurality of flat washers, and engages with the screw. The cam forms a plurality of peaks, and the cam follower defines a plurality of troughs corresponding to the peaks of the cam. The cam is fixed to the first stand, and the cam follower is fixed to the second stand. The first stand is connected to the LCD panel. The cam can rotate together with the first stand, so that the peaks of the cam engage in the valleys of the cam follower, thereby, positioning the LCD panel.

However, the cam and the cam follower are difficult to be machined, because the valleys need to be an appropriate size corresponding to that of the peaks of the cam. Furthermore, a total thickness of the cam and the cam follower along the shaft is large, so a thickness of the typical hinge is also large.

Therefore, a hinge assembly which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
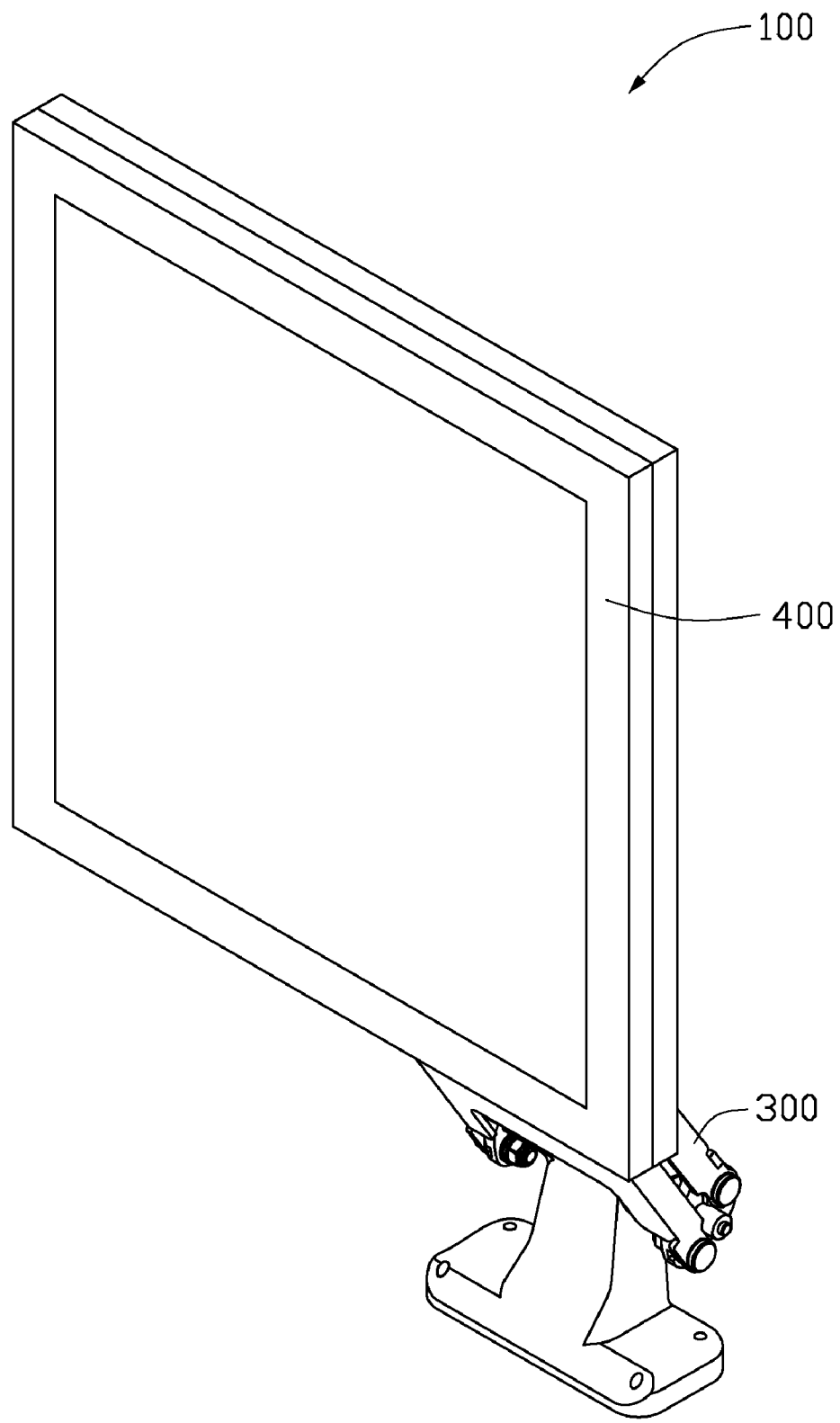
FIG. 1 is an isometric view of an LCD device using an embodiment of a hinge assembly, the hinge assembly including a pivot shaft, a first supporting member, a second supporting member, a positioning member, a second positioning member, and a fastening member.
Figure 2:
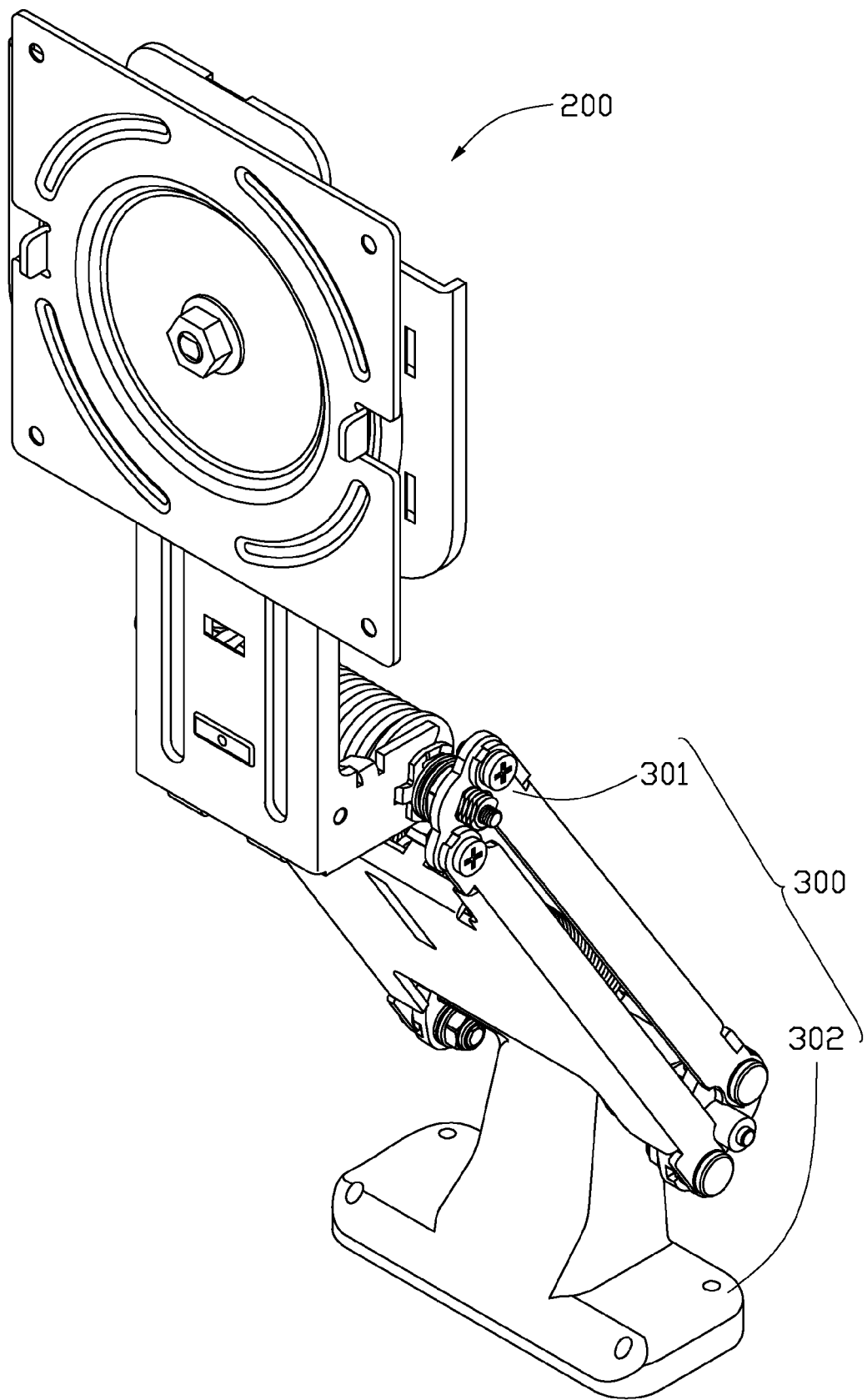
FIG. 2 is an assembled, isometric view of the LCD device of FIG. 1 without an LCD panel.

Referring to FIGS. 1 and 2, an embodiment of a hinge assembly 200 applied in an LCD device 100 is shown. The LCD device 100 includes the hinge assembly 200, a stand 300, and an LCD panel 400. The stand 300 includes a supporting frame 301 and a base 302. The supporting frame 301 is rotatably connected to the base 302. The LCD panel 400 is connected to the stand 300 via the hinge assembly 200.

Figure 3:
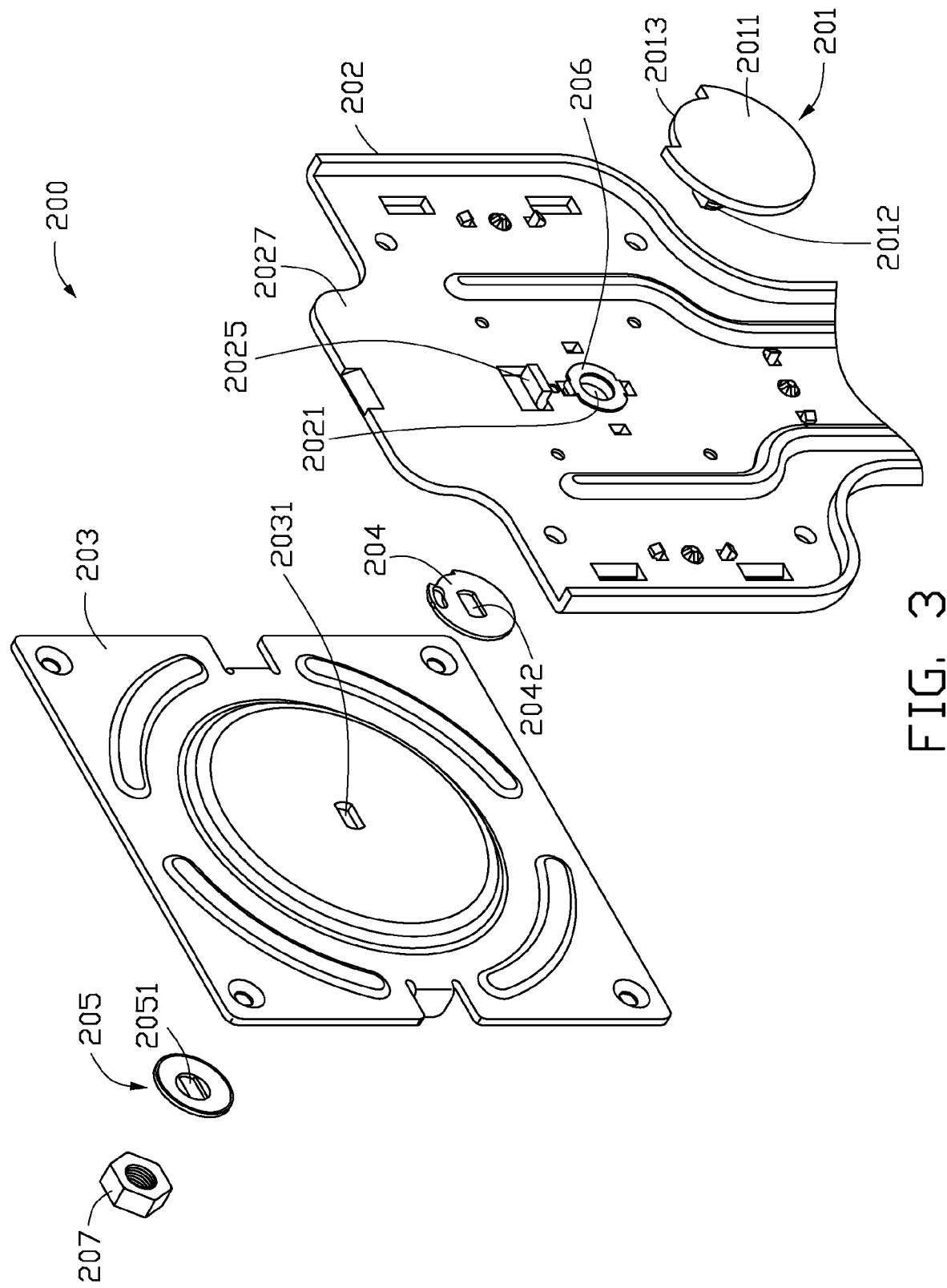
FIG. 3 is an exploded, isometric view of the hinge assembly of FIG. 2.
Figure 4:
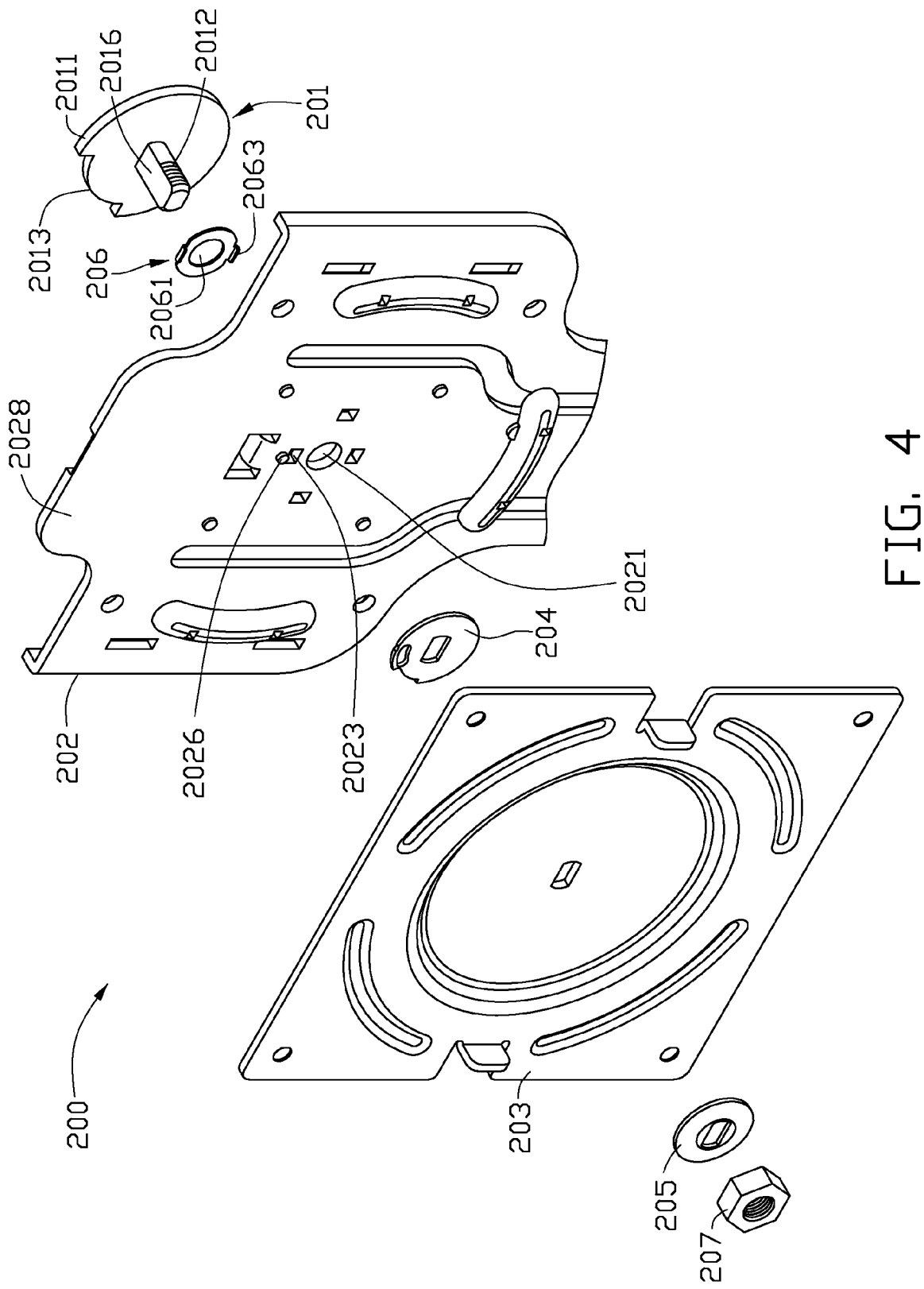
FIG. 4 is similar to FIG. 3, but viewed from another aspect.

Referring to FIGS. 3 and 4, the hinge assembly 200 includes a pivot shaft 201, a first supporting member 202, a second supporting member 203, a positioning member 204, a spring washer 205, a friction member 206, and a fastening member 207. The first supporting member 202 is rotatably connected to the supporting frame 301, and the second supporting member 203 is fixed to the LCD panel 400.

The pivot shaft 201 defines two positioning planes 2016 opposite to each other. A flange 2011 is formed on an end of the pivot shaft 201, and a threaded portion 2012 is formed on the other end of the pivot shaft 201. The flange 2011 defines an arched restricting groove 2013 in a periphery.

The first supporting member 202 defines a circular pivot hole 2021 in a center, and four fixing holes 2023 around the pivot hole 2021. The first supporting member 202 has a first surface 2027 and a second surface 2028 opposite to the first surface 2027. A restricting portion 2025 is formed on the first surface 2027 of the first supporting member 202 adjacent to the pivot hole 2021. A positioning protrusion 2026 is formed on the second surface 2028 of the first supporting member 202 adjacent to the pivot hole 2021.

The second supporting member 203 defines a shaft hole 2031 corresponding to the pivot shaft 201. In the illustrated embodiment, the second supporting member 203 is substantially rectangular shaped.

Figure 5:
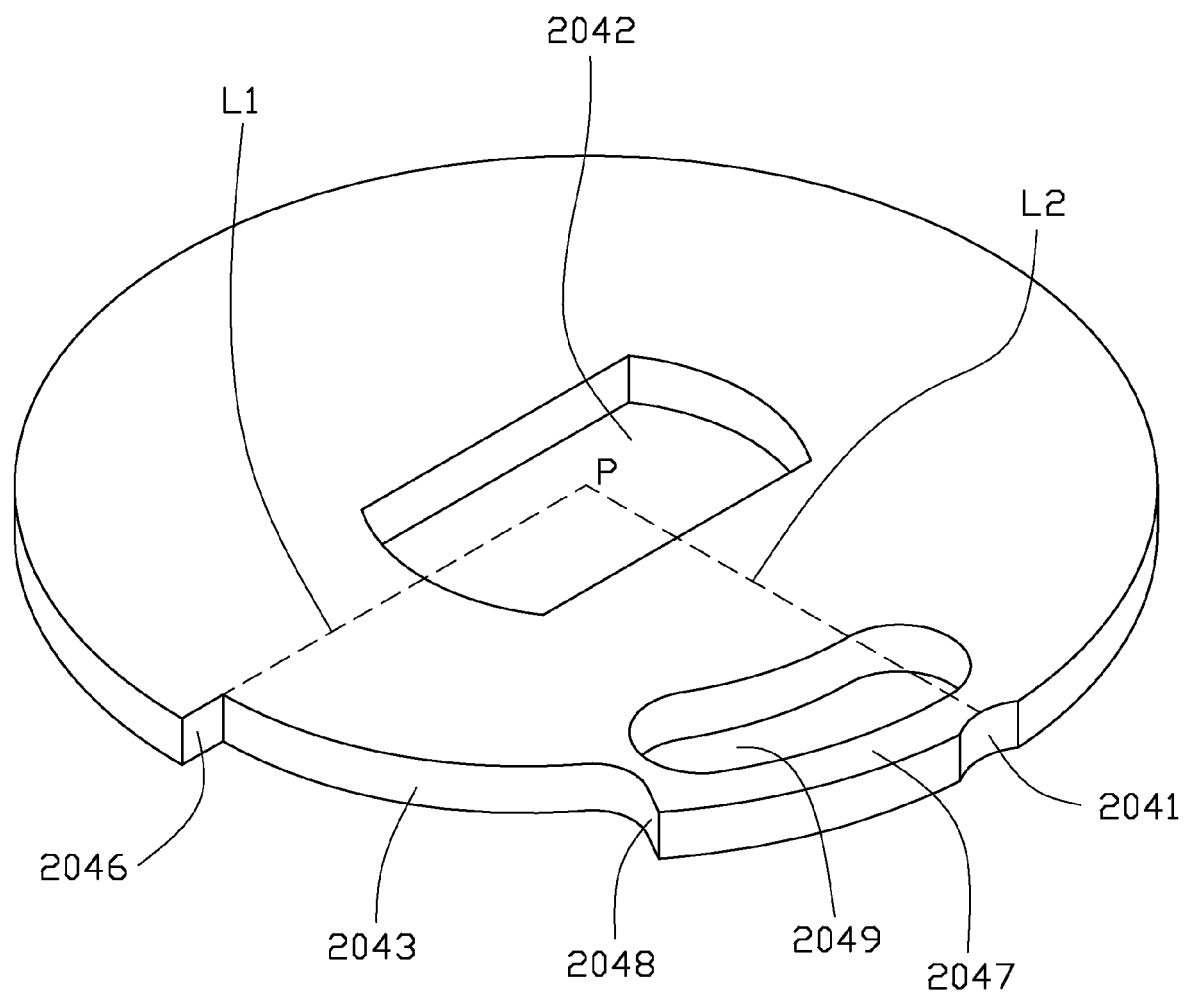
FIG. 5 is an isometric view of the positioning member of the hinge assembly of FIG. 1.

Referring to FIG. 5, the positioning member 204 is elastic, and a center of the positioning member 204 defines a connecting hole 2042 having a shape corresponding to the shape of the pivot shaft 201. A positioning groove 2041 and an arched sliding groove 2043 are defined in a periphery of the positioning member 204. A width of the sliding groove 2043 is larger than that of the positioning groove 2041. The positioning member 204 further defines a cavity 2049 between the positioning groove 2041 and the sliding groove 2043, and adjacent to the periphery of the positioning member 204, thus forming an elastic portion 2047 between the positioning groove 2041 and the sliding groove 2043. The sliding groove 2043 has a first end 2046 and a second end 2048. The first end 2046 is arched. A first axis $L_1$ extending from a center point P of the positioning member 204 to the first end 2046 of sliding groove 2043 and a second axis $L_2$ connects a bottom of the positioning groove 2041 with a center point P of the positioning member 204, are substantially perpendicular to each other.

The spring washer 205 defines an assembling hole 2051 in a center portion having a shape corresponding to the shape of the cross-section of the pivot shaft 201. The friction member 206 defines a through slot 2061 in a center portion. Two connecting portions 2063 substantially extend from opposite sides of the friction member 206 perpendicularly. The connecting portions 2063 are configured for engaging in the fixing holes 2023 of the first supporting member 202. In the illustrated embodiment, the fastening member 207 is a nut.

Referring to FIGS. 3 through 5, in assembling the hinge assembly 200, the pivot shaft 201 is inserted through the friction member 206, the pivot hole 2021 of the first supporting member 202, the connecting hole 2042 of the positioning member 204, the shaft hole 2031 of the second supporting member 203, the spring washer 205, and engages with the fastening member 207. The connecting portions 2063 of the friction member 206 is engaged in the fixing holes 2023 of the first supporting member 202. The restricting portion 2025 is slidably received in the restricting groove 2013 of the pivot shaft 201. The positioning protrusion 2026 is engaged in the positioning groove 2041 of the positioning member 204. Then, the first supporting member 202 is rotatably sleeved on the pivot shaft 201, and the second supporting member 203 is non-rotatably sleeved on the pivot shaft 201. After the hinge assembly 200 is assembled, the LCD panel 400 is fixed to the second supporting member 203.

At rest, the positioning protrusion 2026 is resisted in the positioning groove 2041 to maintain the LCD panel 400 from rotating arbitrarily and to keep the LCD panel 400 in a normal state. The LCD panel 400 can be rotated about an axis of the pivot shaft 201. When the LCD panel 400 is rotated in a clockwise direction, the restricting protrusion 2025 slides in the restricting groove 2013 of the pivot shaft 201. When the LCD panel rotates, the elastic portion 2047 deforms and displaces into the cavity 2049, and the positioning protrusion 2026 of the first supporting member 202 disengages from the positioning groove 2041 of the positioning member 204. When the LCD panel 400 is further rotated in the clockwise direction, the positioning protrusion 2026 of the first supporting member 202 slides in the sliding groove 2043. After the LCD panel 400 is rotated 90 degrees, the restricting protrusion 2025 slides to an end of the restricting groove 2013 of the flange 2011. At the same time, the positioning protrusion 2026 resists the first end 2046 of the sliding groove 2043.

The elastic portion 2047 between the positioning groove 2041 and the sliding groove 2043 of the positioning member 204, allows the positioning protrusion 2026 of the first supporting member 202 to be rotated from the positioning groove 2041, through the elastic portion 2047, and positioned in the positioning groove 2041. Therefore, the first supporting member 202 can be positioned to a predetermined position. Furthermore, due to the sliding groove 2043 of the positioning member 204, the first supporting member 202 can rotate freely relative to the second supporting member 203. Also, the positioning protrusion 2026 of the first supporting member 202 engages smoothly with the sliding groove 2043 because the first end 2048 of the positioning member 204 is arched. A thickness of the positioning member 204 is small, so a thickness of the hinge assembly 200 is also small.

It may be appreciated that only the elastic portion 2047 of the positioning member 204 needs to be elastic. When the positioning protrusion 2026 resists the elastic portion 2047, the elastic portion 2047 deforms and displaces into the cavity 2049. The restricting portion 2025 may be formed on the first supporting member 202 opposite to the second supporting member 203, and the second supporting member 203 defines a restricting groove for receiving the restricting portion 2025. In addition, a maximum rotating angle between the first supporting member 202 and the second supporting member 203 can be changed by varying a length of the restricting groove 2013 of the flange 2011.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A hinge assembly, comprising:
   a pivot shaft;
   a first supporting member rotatably sleeved on the pivot shaft, wherein a positioning protrusion formed on the first supporting member;
   a second supporting member non-rotatably sleeved on the pivot shaft; and
   a positioning member non-rotatably sleeved on the pivot shaft, wherein a positioning groove and a sliding groove are defined in a periphery of the positioning member; the positioning member further defines an elongated curved cavity between the positioning groove and the sliding groove, and adjacent to the periphery of the positioning member, thus forming an elastic portion between the positioning groove and the sliding groove; when the first supporting member is positioned relative to the second supporting member, the positioning protrusion is received in the positioning groove; when the first supporting member rotates relative to the second supporting member to make the positioning protrusion disengage from the positioning groove of the positioning member, the elastic portion of the positioning member deforms and displaces into the cavity.

2. The hinge assembly of claim 1, wherein the positioning member is positioned between the first supporting member and the second supporting member.

3. The hinge assembly of claim 1, wherein a flange is formed on an end of the pivot shaft, the flange defines a restricting groove; a restricting portion is formed on the first supporting member, and the restricting portion is slidably received in the restricting groove.

4. The hinge assembly of claim 3, wherein a threaded portion is formed on the other end of the pivot shaft opposite to the flange, the hinge assembly further comprises a fastening member engaging with the threaded portion.

5. The hinge assembly of claim 4, wherein the hinge assembly further comprises a spring washer non-rotatably sleeved on the pivot shaft, and positioned between the fastening member and the second supporting member.

6. The hinge assembly of claim 1, wherein the hinge assembly further comprises a friction member sleeved on the pivot shaft, and engages with the first supporting member.

7. The hinge assembly of claim 6, wherein at least one connecting portion substantially perpendicularly extends from the friction member; the first supporting member defines at least one fixing hole; the at least one connecting portion engages in the at least one fixing hole of the first supporting member.

* * * * *